INVENTOR
CLEVELAND HILL,

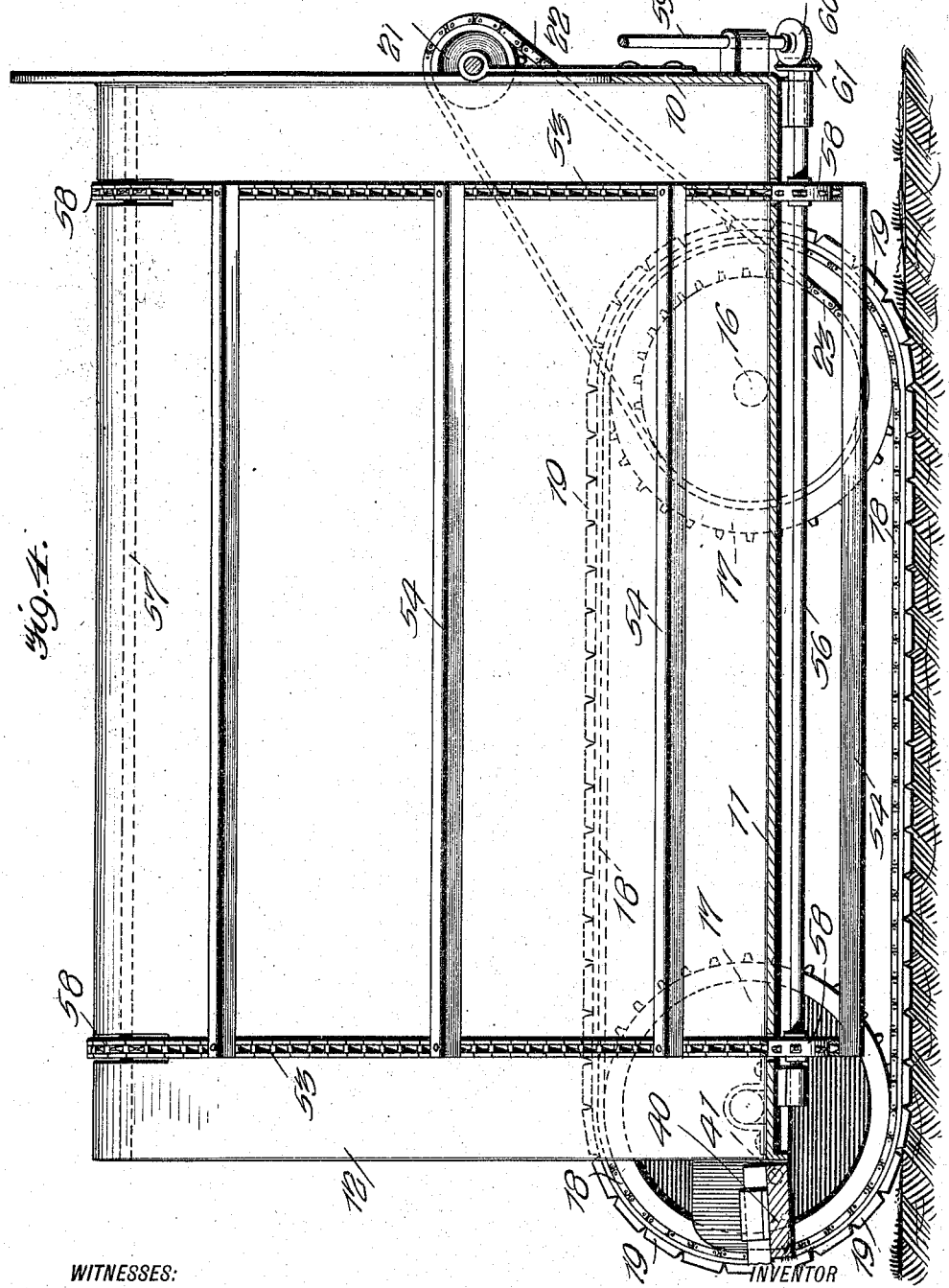

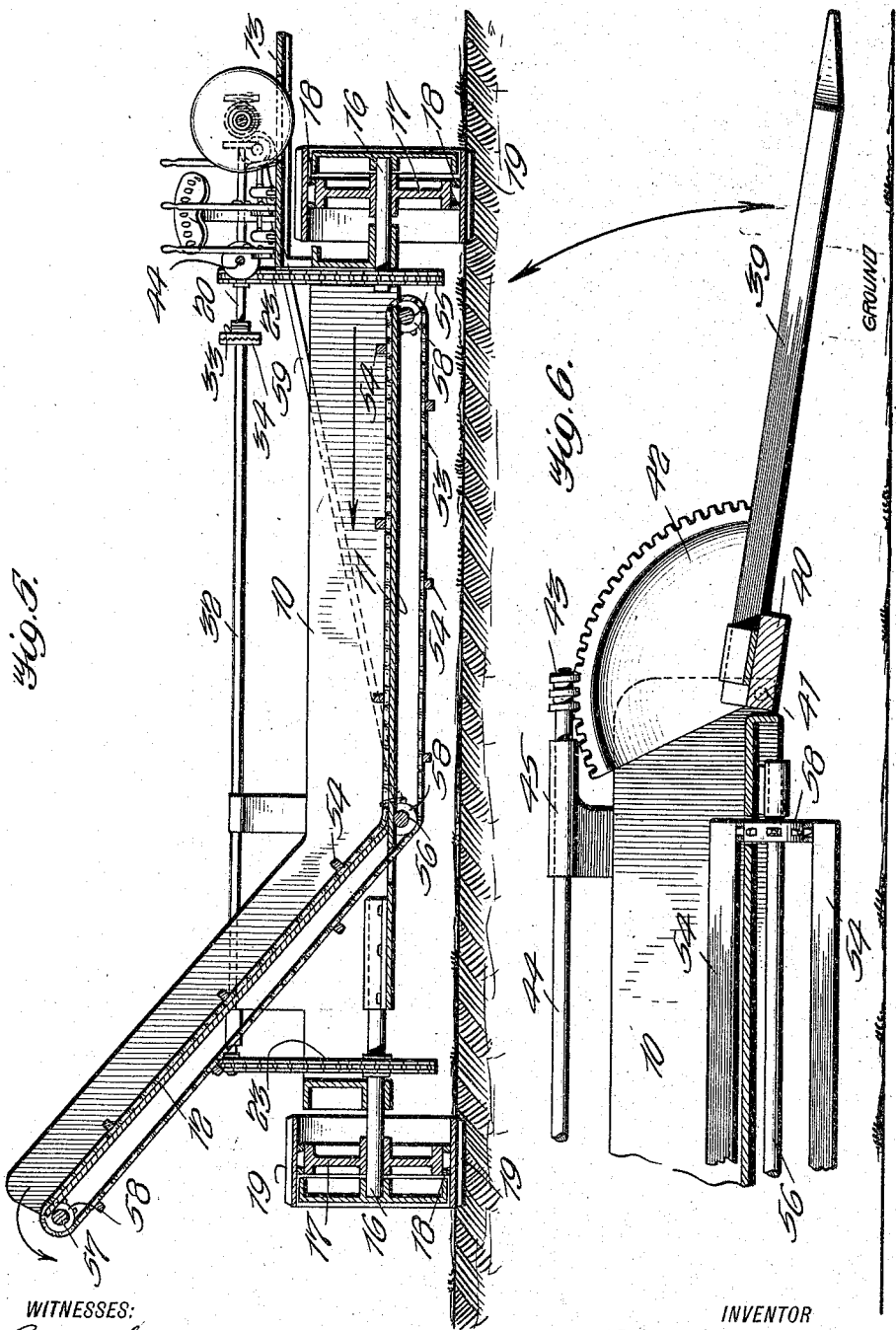

UNITED STATES PATENT OFFICE.

CLEVELAND HILL, OF MERRILLVILLE, CALIFORNIA

HAY-LOADING MACHINE.

1,194,179.         Specification of Letters Patent.       Patented Aug. 8, 1916.

Application filed October 9, 1915. Serial No. 55,086.

*To all whom it may concern:*

Be it known that I, CLEVELAND HILL, a citizen of the United States, and a resident of Merrillville, in the county of Lassen and State of California, have invented an Improvement in Hay-Loading Machines, of which the following is a specification.

This invention is an improvement in harvesting machines and has particular reference to an apparatus for loading hay and the like.

An object of the invention is to provide an apparatus of the class indicated which provides novel means for propelling the entire device and at the same time gathering the harvest upon a platform having a conveyer associated therewith which, when said platform is loaded, is adapted to be operated to convey the load upward upon a delivery incline from whence it is deposited into a wagon or other vehicle.

Another object is the provision of a novel guiding means for the apparatus which consists in disconnecting one or the other of the caterpillar tractors, used in connection with the invention, from its source of driving power, depending upon the direction in which it is desired to propel the machine.

The inventive idea involved is capable of receiving a variety of mechanical expressions, one of which, for the purpose of illustrating the invention, is shown in the accompanying drawings; but it is to be expressly understood that said drawings are used merely to facilitate the description of the invention as a whole and not to define the limits thereof, reference being had to the appended claims for this purpose.

Figure 1:
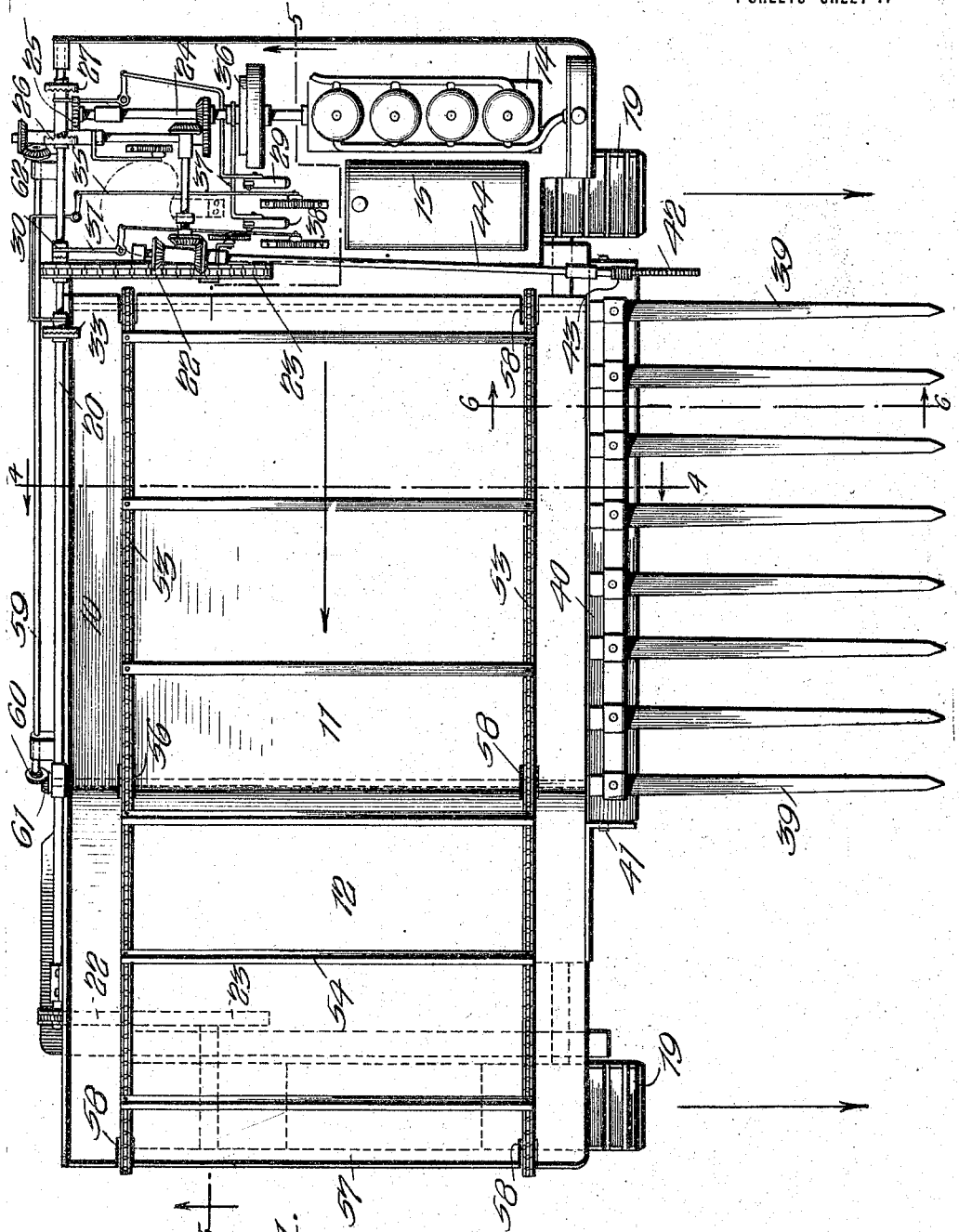
Figure 2:
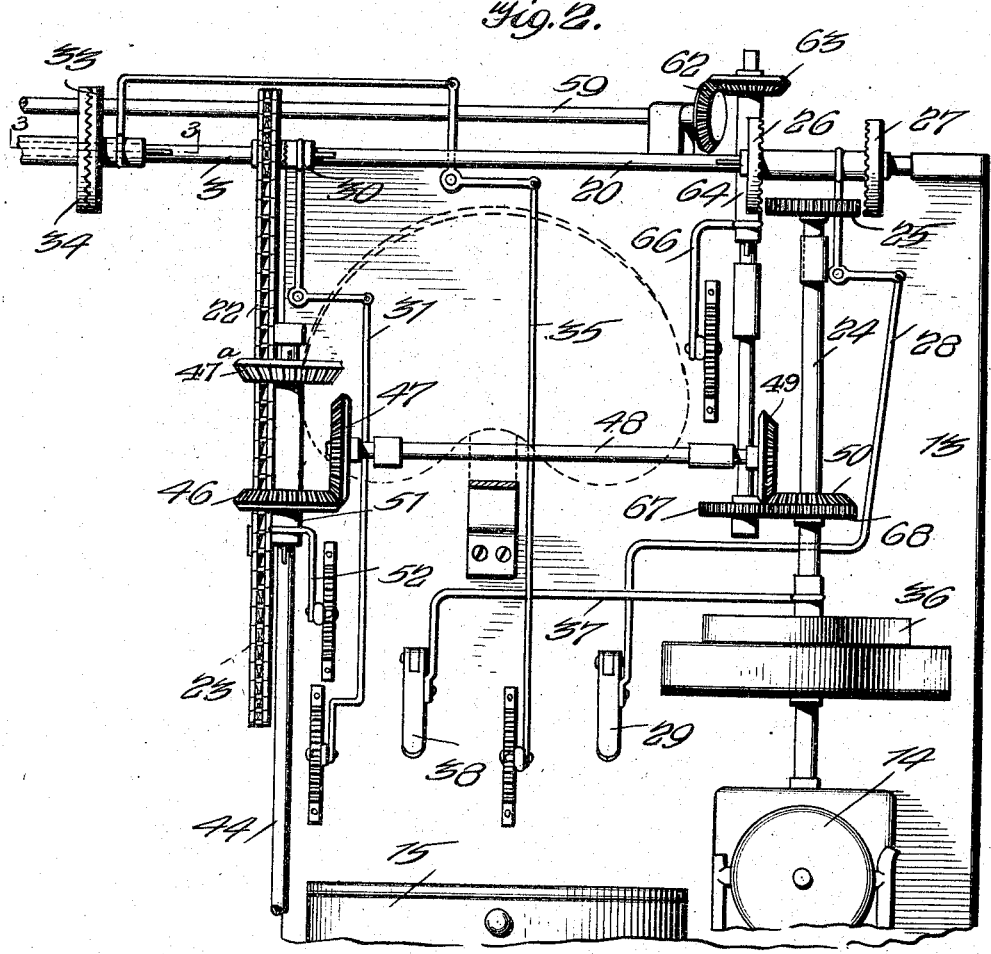
Figure 3:
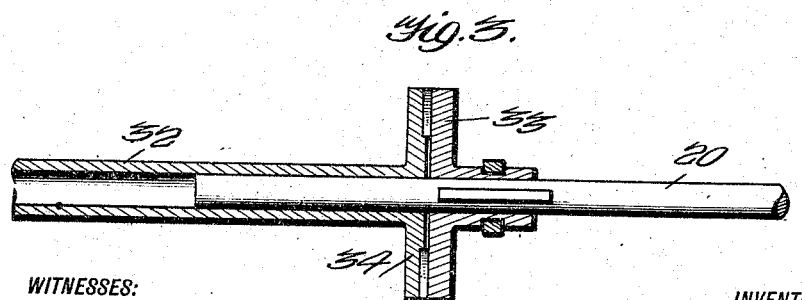

In the drawings:—Figure 1 is a top plan view of the machine constructed in accordance with the invention. Fig. 2 is an enlarged fragmentary top plan view of the means for controlling the machine in its different phases of operation. Fig. 3 is an enlarged section on the line 3—3 of Fig. 2. Fig. 4 is a section on the line 4—4 of Fig. 1. Fig. 5 is a section on the line 5—5 of Fig. 1. Fig. 6 is a section on the line 6—6 of Fig. 1.

The machine preferably comprises a frame 10 consisting of a central loading platform 11 having extending from one end thereof an upwardly inclined delivery chute 12 and at its other end an elevated support 13 upon which is adapted to be mounted means for operating the machine which preferably includes a gasolene motor conventionally illustrated at 14 and supplied by means of a tank 15. Preferably, the frame 10 is supported and propelled by caterpillar tractors which include front and rear shafts 16 journaled in the frame and having mounted thereon the sprocket wheels 17 which are connected by the chains 18. Secured to these chains are the endless tractor elements 19 which are adapted to engage the ground whereby a relatively long bearing surface is provided to enable the machine to steadily travel over uneven ground. Means are provided for driving these tractors which consists of a shaft 20 mounted in the rear of the machine and transversely thereof, said shaft carrying the sprocket wheels 21 over each of which passes a drive chain 22 which is also connected to a large sprocket wheel 23 carried upon the rear shafts 16 which are journaled in the frame 10. A main drive shaft 24 extending longitudinally of the machine is connected at one end to the source of power 14 and has provided at its other end a gear 25 which is adapted to engage shiftable gears 26 or 27 mounted upon the shaft 20 and adapted to be thrown into engagement with said gear 25 when it is desired to propel the machine forwardly or reverse the direction thereof. The shifting of the gears 26 and 27 is accomplished through the connections 28 which are adapted to be operated by the lever 29 located upon the elevated support 13 adjacent the driver's seat as shown in dotted lines.

Assuming that the machine is traveling in the direction of the arrows in Fig. 1 and that it is desired to guide the same to the left or right, means are provided for stopping the operation of one or the other of the tractors, said means including a clutch 30 associated with the sprocket wheel 21 adjacent the support 13. Suitable connections 31 are provided for operating this clutch and when the same is thrown out of engagement with said sprocket wheel the tractor at that end of the machine will cease to be operated and the machine will turn to the left of the direction in which it is traveling.

Referring now to Fig. 3 it will be seen that the shaft 20 includes a hollow sleeve member 32 which extends from the clutch generally indicated by 33, and arranged adjacent the sprocket wheel 21, to the sprocket wheel 21 at the other end of the machine. This clutch 33 is associated with a toothed disk 34 carried by the adjacent end of the sleeve 32 and is adapted to engage said disk when the tractor at the left of Fig. 1 is being operated. Should it be desired to stop the operation of this tractor it is only necessary to operate the connections 35 to withdraw the clutch 33 from engagement with the disk 34 whereupon the sleeve portion 32 of the shaft 20 will cease to rotate and drive the sprocket wheel 21 with which the tractor at the left of Fig. 1 is connected. Such manipulation will cause the entire machine to turn to the right of the direction in which the machine is traveling. By throwing both of the clutches 30 and 33 out of clutching engagement with their respective elements, the machine may be brought to a stop. This may also be accomplished by shifting the clutch, diagrammatically illustrated at 36 and mounted upon the main drive shaft 24, by means of a connection 37 actuated by a lever 38.

When the machine is traveling forward the hay, or whatever harvest is being gathered, is conveyed upon the platform 11 by means of a plurality of fingers 39 extending forwardly of the machine and connected at their inner ends to a base 40 which is pivotally mounted at 41 to the front edge of the frame 10. A toothed sector 42 is carried by one end of the base 40 and is adapted to be engaged by the worm 43 carried by the shaft 44 journaled in the bearings 45 formed upon the frame 10. This mechanism is provided for the purpose of swinging the fingers 39 to a substantially vertical position after the machine has been brought to a stop in order to throw the hay gathered on said fingers onto the platform 11. By referring to Fig. 2, it will be seen that the shaft 44 is operated through the medium of a bevel gear 46 carried by one end of said shaft and meshing with a similar gear 47 mounted upon one end of a shaft 48 extending transversely to the shaft 44, the other end of said shaft carrying a bevel gear 49 and meshing with a similar gear 50 mounted upon the main drive shaft 24. The gear 46 is shiftable into and out of engagement with the gear 47 by means of the sleeve 51 operated by the connections 52 so that when the gear 46 is in engagement with the gear 47 the shaft 44 will be rotated. The gear 47ª is employed for the purpose of permitting the return of the fingers 39 to their lowered position. After a sufficient amount of hay has been deposited upon the platform 11 it is desired to transfer the same from this platform into a suitable conveyance for transportation and to this end there is provided a conveyer generally indicated by 53 including cross bars 54 spaced at suitable intervals, said conveyer being movable transversely of the platform 11 and incline delivery chute 12. The conveyer is mounted upon suitable shafts 55, 56, and 57 journaled beneath the frame 10 and extending longitudinally thereof, said shafts having gear wheels 58 mounted thereon for the purpose of driving the chains of the conveyer 53. When this conveyer is operated the same travels in the direction of the arrow shown in Fig. 5 and the hay is conveyed from the platform 11 up the delivery chute 12 and from thence off of the end thereof into a wagon or other vehicle which is located beneath the delivery end. The conveyer is driven by means of an obliquely extending shaft 59 having at its lower end a gear 60 meshing with the similar gear 61 carried by the rear end of the shaft 56, the latter being located intermediate the shafts 55 and 57 and at the junction of the lower end of the chute 12 with the platform 11. The upper end of the shaft 59 is also provided with a bevel gear 62 meshing with a similar gear 63 which is carried by a sleeve 64 shiftable on a shaft 65 by means of connections 66. The forward end of the shaft 65 is provided with a gear 67 meshing with the gear 68 which is preferably formed integral with the gear 50 mounted upon the main drive shaft 24. Thus by throwing the gear 63 in engagement with gear 62 the shaft 59 is driven and motion is in turn imparted to the shaft 56 whereupon the conveyer 53 is operated to deliver the load of hay from the platform 11.

What is claimed is:—

1. A loading machine comprising a frame, propelling devices therefor, means for operating said propelling devices independently of each other, means for gathering and transferring a load onto said frame, and means including a common source of power for actuating the first and last named means independently of each other, said gathering and transferring means being capable of transporting a load while the propelling means are inactive.

2. A loading machine comprising a frame, a plurality of gathering fingers pivoted thereto and normally in a substantially horizontal position, a segmental gear associated with said fingers, a worm shaft for oscillating said gear to raise and lower said fingers, a conveyer arranged transversely of said frame and adapted to carry the load to the delivery end thereof, and reversible mechanism for operating said shaft.

3. In a loading machine comprising a frame including a central loading platform, an elevated supporting platform at one end thereof, tractors for propelling said frame, a source of driving power mounted upon said elevated platform, a shaft extending transversely of the rear of the machine and operated by said source of power, driving connections between said shaft and said tractors, a clutch associated with said shaft, a sleeve associated with said shaft and carrying one of the members of said clutch whereby the tractor at one end of the machine is operated when the members of the clutch are in engagement, a second clutch mounted upon said shaft and adapted to operate the other of the tractor members, and means for operating each of said clutches whereby said tractors may be simultaneously or independently operated.

4. A loading machine comprising a frame, a plurality of loading fingers pivoted thereto, a segmental gear associated with said fingers, a worm shaft for operating said gear to raise and lower said fingers, a loading platform for receiving material from said fingers when the latter are raised, an endless conveyer movable transversely of said platform, shafts for supporting said conveyer extending longitudinally of said platform, another shaft extending transversely of the rear of said platform and connected to one of the first-named shafts, a source of driving power carried by said frame and including a main driving shaft, an auxiliary shaft connected to said main driving shaft and extending parallel thereto, and gear connections between said auxiliary shaft and said transversely arranged shaft for driving the latter to operate the conveyer supporting shafts.

5. A loading machine comprising a frame, a loading platform associated with said frame, an endless conveyer movable transversely of said platform, shafts for supporting said conveyer extending longitudinally of said platform, another shaft extending transversely of the rear of said platform and connected to one of the first-named shafts, a source of driving power carried by said frame and including a main driving shaft, an auxiliary shaft connected to said main driving shaft and extending parallel thereto, and gear connections between said auxiliary shaft and said transversely arranged shaft for driving the latter to operate the conveyer supporting shafts.

6. A loading machine comprising a central loading platform, a delivery chute at one end thereof, an elevated supporting platform at the other end thereof, a conveyer associated with said loading platform and movable transversely thereof and said delivery chute, vertically adjustable fingers for transferring a load onto said conveyer, tractors for propelling said frame, a divided shaft for operating said tractors, a clutch member associated with the parts of said shaft, a shaft for driving said conveyer, an auxiliary shaft for operating the last-named shaft, a clutch associated therewith, a main drive shaft connected to said auxiliary shaft, a source of power for driving said main shaft and mounted on said elevated supporting platform and connections all mounted on said elevated platform for operating the clutches associated with said tractor propelling shaft and said auxiliary shaft.

CLEVELAND HILL.

Witnessed by—
J. E. Pardu,
Thomas Hill.